United States Patent
Li et al.

(10) Patent No.: US 11,639,306 B2
(45) Date of Patent: May 2, 2023

(54) CURVED GLASS THERMAL FORMING DEVICE AND METHOD THEREFOR

(71) Applicants: TUNGHSU TECHNOLOGY GROUP CO., LTD., Beijing (CN); TUNGHSU GROUP CO., LTD., Hebei (CN)

(72) Inventors: Qing Li, Shijiazhuang (CN); Qingwen Li, Shijiazhuang (CN); Xianyou Jin, Shijiazhuang (CN); Zhaoting Li, Shijiazhuang (CN)

(73) Assignees: TUNGHSU TECHNOLOGY GROUP CO., LTD., Beijing (CN); TUNGHSU GROUP CO., LTD., Shijiazhuang (CN)

(*) Notice: Subject to any disclaimer, the term of this patent is extended or adjusted under 35 U.S.C. 154(b) by 38 days.

(21) Appl. No.: 16/611,716

(22) PCT Filed: May 24, 2018

(86) PCT No.: PCT/CN2018/088255
§ 371 (c)(1),
(2) Date: Nov. 7, 2019

(87) PCT Pub. No.: WO2018/214945
PCT Pub. Date: Nov. 29, 2018

(65) Prior Publication Data
US 2020/0109077 A1   Apr. 9, 2020

(30) Foreign Application Priority Data

May 25, 2017 (CN) .......................... 201710380364.0

(51) Int. Cl.
*C03B 23/03* (2006.01)
(52) U.S. Cl.
CPC ...... *C03B 23/0305* (2013.01); *C03B 23/0307* (2013.01)

(58) Field of Classification Search
CPC ... C03B 23/0307; C03B 11/02; C03B 35/142; C03B 35/08; C03B 23/0305;
(Continued)

(56) References Cited

U.S. PATENT DOCUMENTS 3,387,963 A * 6/1968 Tilton ...................... C03B 25/08
65/350
3,819,349 A * 6/1974 Shimizu .............. C03B 23/0307
65/63
(Continued)

FOREIGN PATENT DOCUMENTS

CN 103732548 A 4/2014
CN 105084722 A 11/2015
(Continued)

OTHER PUBLICATIONS

Office Action dated Nov. 10, 2020 in corresponding Japanese Application No. 2019-560703; 8 pages including English-language translation.
(Continued)

Primary Examiner — Cynthia Szewczyk
(74) Attorney, Agent, or Firm — Maier & Maier, PLLC

(57) ABSTRACT

The present disclosure relates to a curved glass thermal forming device and method. The curved glass thermal forming device includes a furnace body having a feed port and a discharge port, wherein the furnace body includes a heating segment, a forming segment and a cooling segment, a rotary table capable of rotating and used for circularly conveying glass to the heating segment, the forming segment and the cooling segment in sequence is arranged in the furnace body, a plurality of female dies for carrying glass are arranged on the rotary table so as to cooperate with a male die in the forming segment to perform press fit forming on the glass.

16 Claims, 2 Drawing Sheets

(58) Field of Classification Search
CPC ............ C03B 2215/67; C03B 2215/86; C03B 2215/87; C03B 2225/00
See application file for complete search history.

(56) References Cited

U.S. PATENT DOCUMENTS

| | | | | |
|---|---|---|---|---|
| 4,057,409 | A | * | 11/1977 | Kudryavtsev ....... C03B 23/0013 65/154 |
| 4,609,391 | A | * | 9/1986 | McMaster ........... C03B 23/0252 65/104 |
| 4,891,055 | A | * | 1/1990 | Shibaoka ............ C03B 23/0258 65/104 |
| 5,019,689 | A | * | 5/1991 | Bollier ................ C03B 23/0357 432/124 |
| 5,290,999 | A | * | 3/1994 | Kuster ................ C03B 23/0302 65/118 |
| 5,908,483 | A | * | 6/1999 | Hileman ................. C03B 11/16 65/29.12 |
| 9,187,358 | B2 | | 11/2015 | Luo et al. |
| 9,550,695 | B2 | | 1/2017 | Immerman et al. |
| 2006/0162384 | A1 | * | 7/2006 | Yamanaka ............. C03B 11/02 65/102 |
| 2010/0281919 | A1 | * | 11/2010 | Bailey ................ C03B 23/0357 65/157 |
| 2012/0216573 | A1 | * | 8/2012 | Dannoux ................ C03B 29/12 65/182.2 |
| 2012/0297828 | A1 | | 11/2012 | Bailey et al. |
| 2013/0125592 | A1 | | 5/2013 | Bisson |
| 2013/0136565 | A1 | * | 5/2013 | Amsden ................ B66C 1/0237 414/800 |
| 2014/0335322 | A1 | | 11/2014 | Luo et al. |
| 2014/0373573 | A1 | | 12/2014 | Hwang et al. |
| 2015/0197039 | A1 | * | 7/2015 | Matsuzuki ............ C03B 11/125 264/297.7 |
| 2015/0274570 | A1 | | 10/2015 | Wada et al. |

FOREIGN PATENT DOCUMENTS

| | | | |
|---|---|---|---|
| CN | 105377781 | A | 3/2016 |
| CN | 105793203 | A | 7/2016 |
| CN | 205874202 | U | 1/2017 |
| CN | 106517762 | A | 3/2017 |
| CN | 107010820 | A | 8/2017 |
| CN | 207130148 | U | 3/2018 |
| JP | H01-242428 | A | 9/1989 |
| JP | 2014-139121 | A | 7/2014 |
| JP | 2014-518839 | A | 8/2014 |
| JP | 2015-502318 | A | 1/2015 |
| JP | 2016-521245 | A | 7/2016 |
| KR | 20150046843 | A | 5/2015 |
| KR | 10-2016-0006719 | A | 1/2016 |
| KR | 20170131128 | A * | 11/2017 |

OTHER PUBLICATIONS

Office Action dated Jan. 28, 2021 in corresponding Korean Application No. 10-2019-7037501; 15 pages including English-language translation.
International Search Report with English translation and Written Opinion in corresponding International Application No. PCT/CN2018/088255, dated Aug. 10, 2018, 20 pages.
First Office Action in corresponding Chinese Application No. 201710380364.0, dated Mar. 13, 2019, 16 pages.
Second Office Action in corresponding Chinese Application No. 201710380364.0, dated Aug. 16, 2019, 8 pages.
Office Action in corresponding Taiwanese Application No. 107118052, dated Jan. 16, 2019, 11 pages.
Notice of Grounds for Rejection in corresponding Taiwanese Application No. 107118052, dated Jun. 27, 2019, 5 pages.

* cited by examiner

CURVED GLASS THERMAL FORMING DEVICE AND METHOD THEREFOR

CROSS-REFERENCE TO RELATED APPLICATION

The present application is a U.S. National Phase of International Patent Application Serial No. PCT/CN2018/088255 filed on May 24, 2018. The entire contents of the above-cited application are hereby incorporated by reference in their entirety for all purposes.

FIELD OF THE INVENTION

The present disclosure relates to a glass processing device, and in particular to a curved glass thermal forming device and a curved glass thermal forming method.

BACKGROUND OF THE INVENTION

At present, there is an increasing demand for curved glass substrates for electronic devices such as mobile phones, and various forming devices for processing the curved glass substrates are also widely available accordingly, wherein a glass thermal forming device is commonly used to realize the processing of the curved glass substrates, the curved glass substrates need to be heated in a thermal forming process of the curved glass substrates, so that the curved glass substrates are heated up to a glass softening point, then pressures are applied to the curved glass substrates, so that the glass is deformed into glass substrates having predetermined curved surfaces, and then the forming of the curved glass substrates is completed. However, the problem of low heating efficiency of the glass substrates is generally present in the prior art.

SUMMARY OF THE INVENTION

The problem solved by the present disclosure is to provide a curved glass thermal forming device for improving the heating efficiency of glass and a curved glass thermal forming method using the curved glass thermal forming device.

In order to achieve the above object, according to one aspect of the present disclosure, a curved glass thermal forming device is provided, including a furnace body having a feed port and a discharge port, wherein the furnace body includes a heating segment, a forming segment and a cooling segment, a rotary table capable of rotating and used for circularly conveying glass to the heating segment, the forming segment and the cooling segment in sequence is arranged in the furnace body, a plurality of female dies for carrying glass are arranged on the rotary table so as to cooperate with a male die in the forming segment to perform press fit forming on the glass, and a heating structure capable of cooperating with the female dies to directly perform local heating on a required curved surface forming portion of the glass is arranged on the heating segment.

Optionally, the heating structure is provided with a heating block for heating the glass, the heating block is provided with a concave surface and a convex surface corresponding to a heating surface of the glass, the convex surface and the surface of the required curved surface forming portion of the glass are arranged correspondingly.

Optionally, a portion of the furnace body corresponding to the rotary table is formed into an annular body or a cylinder, a plurality of stations are formed in a circumferential direction of the furnace body, and the heating segment, the forming segment and the cooling segment are respectively arranged on the stations.

Optionally, in a conveying sequence of the rotary table, the heating segment is arranged on the foremost station of the furnace body and a sheet glass feeding machine for feeding the glass is arranged on the heating segment; the cooling segment is arranged on the last station of the furnace body and a sheet glass taking machine is arranged on the cooling segment, and the forming segments are arranged on at least two stations between the foremost station and the last station.

Optionally, the forming segment includes a male die closing segment portion and a curved surface forming segment portion; a male die is arranged on the male die closing segment portion to be capable of being closed with the female die after the heating on the glass (2) is completed by which cooperating with the heating structure, and a pressure device is arranged on the curved surface forming segment portion to apply a pressure to the male die after the die closing so as to perform curved surface forming on the glass.

Optionally, the male die in the forming segment is rotated to the station in front of the cooling segment together with the female die after being closed with the male die.

Optionally, the forming segment further includes a male die separating segment portion located between the curved surface forming segment portion and the cooling segment and for separating the male die from the female die.

Optionally, the male die separating segment portion and the male die closing segment portion share one male die.

Optionally, the curved surface forming segment portions are arranged on at least two stations of the furnace body, and the curved surface forming segment portions are sequentially arranged in the conveying sequence.

Optionally, a heating device for heating the female die and the male die are arranged in the furnace body.

Optionally, the heating device includes a female die heating device arranged on the surface of the female die facing away from the glass, and a male die heating device arranged on the surface of the male die facing away from the glass, and a controller for controlling the heating temperature of the female die heating device and the male die heating device is arranged on the heating device.

Optionally, a cleaning device for cleaning the male die is arranged on the cooling segment.

Optionally, the furnace body further includes a feed segment having the feed port and a discharge segment having the discharge port, and in the conveying sequence of the rotary table, the feed segment is in communication with the heating segment located at the foremost station, and the discharge segment is in communication with the cooling segment located at the last station.

Optionally, a gas supply device for injecting a nitrogen gas is arranged in the furnace body, so that the furnace body is filled with the nitrogen gas with a preset pressure in a curved surface forming process of the glass.

Optionally, multiple layers of one-way doors for preventing the entry of external air are respectively arranged on the feed port and the discharge port.

Optionally, an odd number of stations being equal to five or more are formed on a portion of the furnace body corresponding to the rotary table along the circumferential direction, the rotary table conveys the glass in a stepping manner by every other station, and a conveying period required for the rotary table to complete the curved surface forming of the glass is two circles.

According to another aspect of the present disclosure, a curved glass thermal forming method is provided, in which the curved glass thermal forming device described above is used to perform curved surface forming on glass.

Optionally, the glass is firstly preheated 300° C. to 400° C. before the heating structure heats the glass.

Optionally, in the heating segment, after a heating block of the heating structure is moved in the height direction to a position 0.2 mm to 1 mm away from the glass, the required curved surface forming portion of the glass is heated to 700° C. to 800° C.

Optionally, the glass is cooled to 300° C. to 400° C. in the cooling segment.

Through the above technical solution, that is, in the curved glass thermal forming process, the glass is conveyed by rotary table, so that the glass sequentially passes through the heating segment, the forming segment and the cooling segment arranged in the furnace body, wherein when the glass is located in the heating segment, local heating is performed on the required curved surface forming portion of the glass through the heating structure to a preset temperature, so that after the required curved surface forming portion of the glass is rapidly heated to the glass softening point, the glass is conveyed to the forming segment to form the required curved surface forming portion of the glass, and then cooling is performed in the cooling segment to cool and size the glass and remove the local stress concentration of the glass at the same time, thereby completing the curved surface forming of the glass. As described above, since the local heating is performed on the required curved surface forming portion of the glass in the heating segment through the heating structure, the heating efficiency of the glass is improved, so that the operation efficiency of curved surface forming of the glass can be further improved.

Other features and advantages of the present disclosure will be described in detail in the detailed description of embodiments that follows.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

REFERENCE SIGNS

| 1 | furnace body | 2 | glass |
|---|---|---|---|
| 3 | turntable table | 4 | female die |
| 5 | male die | 6 | heating block |
| 7 | sheet glass feeding machine | 8 | sheet glass taking machine |
| 9 | heating device | 11 | feed port |
| 12 | discharge port | 13 | heating segment |
| 14 | cooling segment | 15 | feed segment |
| 16 | discharge segment | 41 | bending portion |
| 52 | pressure application portion | 61 | concave surface |
| 62 | convex surface | 63, 93 | electric heating rods |
| 91 | female die heating device | 92 | male die heating device |
| 101 | first segment | 102 | second segment |
| 103 | third segment | 104 | fourth segment |
| 105 | fifth segment | 106 | sixth segment |
| 107 | seventh segment | 108 | eighth segment |
| 109 | ninth segment | 110 | tenth segment |
| 111 | eleventh segment | 200 | controller |
| 202 | cleaning device | 204 | gas supply device |
| 206 | barrier | 208 | door |
| 300 | pressure device | | |

DETAILED DESCRIPTION OF THE EMBODIMENTS

Specific embodiments of the present disclosure will be described in detail below with reference to the drawings. It should be understood that the specific embodiments described herein are merely used for illustrating and explaining the present disclosure, rather than limiting the present disclosure.

Figure 1:
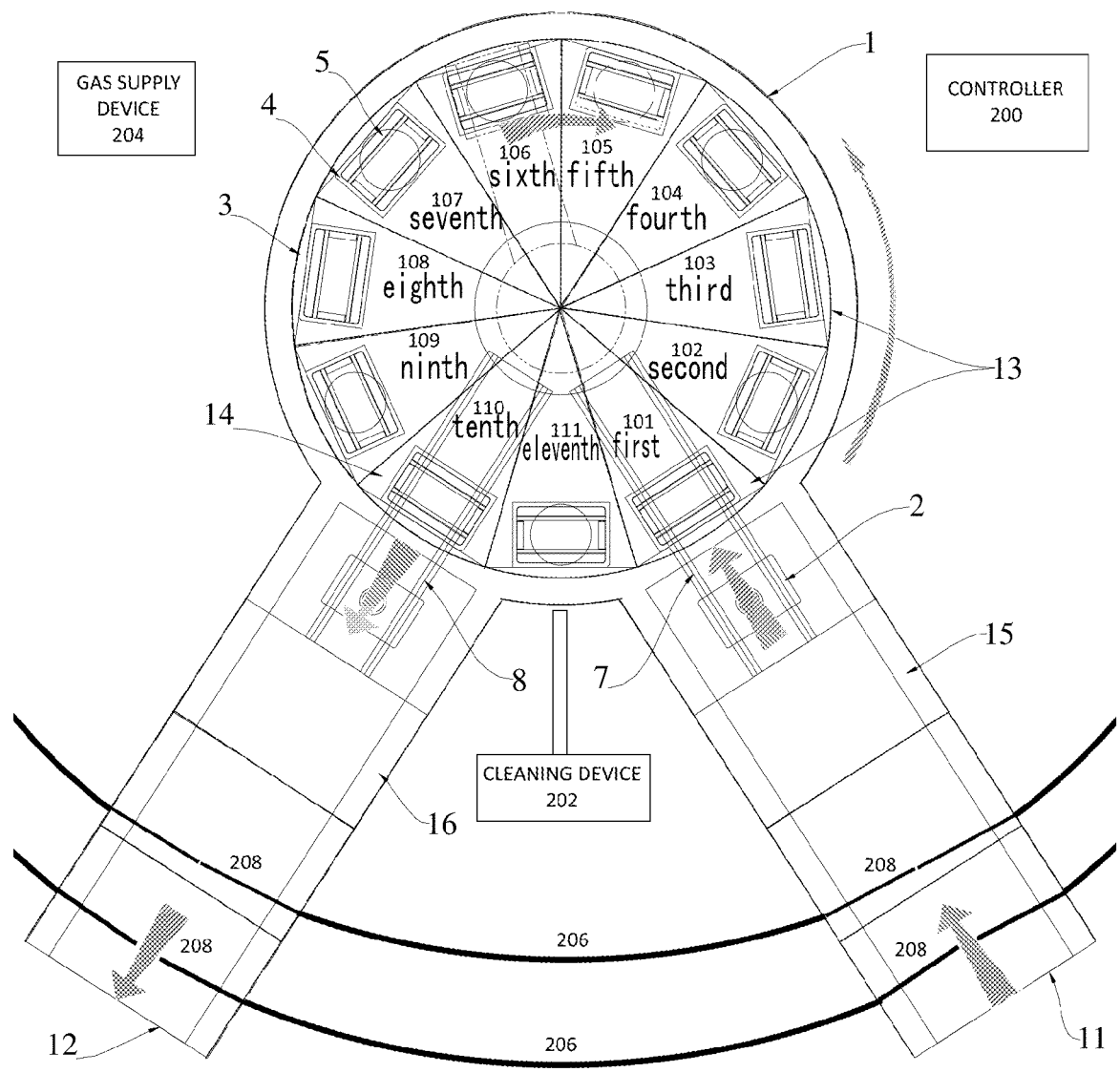
FIG. 1 is a structural schematic diagram of a curved surface thermal forming device according to a specific embodiment of the present disclosure.

As shown in FIG. 1, according to one aspect of the present disclosure, a curved glass thermal forming device is provided, including a furnace body 1 having a feed port 11 and a discharge port 12, wherein the furnace body 1 includes a heating segment 13, a forming segment and a cooling segment 14, a rotary table 3 capable of rotating and used for circularly conveying glass to the heating segment 13, the forming segment and the cooling segment 14 in sequence is arranged in the furnace body 1, a plurality of female dies 4 for carrying glass 2 are arranged on the rotary table 3 so as to cooperate with a male die 5 in the forming segment to perform press fit forming on the glass 2, and a heating structure capable of cooperating with the female dies 4 to directly perform local heating on a required curved surface forming portion of the glass 2 is arranged on the heating segment 13. That is, in a curved glass thermal forming process, the glass 2 is conveyed by the rotary table 3, so that the glass 2 sequentially passes through the heating segment 13, the forming segment and the cooling segment 14 arranged in the furnace body 1, wherein when the glass 2 is located in the heating segment 13, local heating is performed on the required curved surface forming portion of the glass 2 through the heating structure to a preset temperature, so that after the required curved surface forming portion of the glass 2 is rapidly heated to the glass softening point, the glass 2 is conveyed to the forming segment to form the required curved surface forming portion of the glass 2, and then cooling is performed in the cooling segment 14 to cool and size the glass 2 and remove the local stress concentration of the glass 2 at the same time, thereby completing the curved surface forming of the glass 2. As described above, since the local heating is performed on the required curved surface forming portion of the glass 2 in the heating segment 13 through the heating structure, the heating efficiency of the glass 2 is improved, so that the operation efficiency of curved surface forming of the glass 2 can be further improved.

Figure 2:
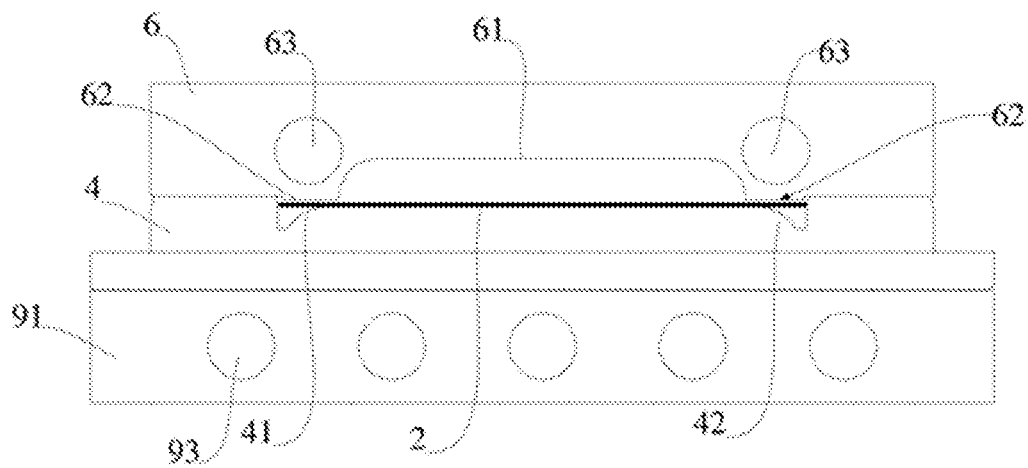
FIG. 2 is a structure diagram of a heating device in the curved surface thermal forming device according to the specific embodiment of the present disclosure.

Herein, optionally, as shown in FIG. 2, the heating structure is provided with a heating block 6 for heating the glass 2, the heating block 6 is provided with a concave surface 61 and a convex surface 62 corresponding to a heating surface of the glass 2, the convex surface 62 and the surface of the required curved surface forming portion of the glass 2 are arranged correspondingly. The heating block 6 can employ electrical heating, high-frequency heating or microwave heating and other manners, the heating block 6 of the heating structure in FIG. 2 employs an electric heating manner in which an electric heating rod 63 is arranged in the heating structure, when the heating block heats the glass 2, in the heating segment 13, after the heating block 6 of the heating structure is moved in the height direction to a position 0.2 mm to 1 mm away from the glass 2, the required curved surface forming portion of the glass 2 is heated. In addition, the convex surface 62 of the heating block 6 corresponds to the surface of the required curved surface forming portion of the glass 2, and the concave surface 61 corresponds to the surface of the remaining portion of the glass 2 and is separated from the surface of the remaining portion by a predetermined distance, therefore, it is ensured that the required curved surface forming portion of the glass 2 is heated above the glass softening point, and meanwhile, the temperature of the remaining portion of the glass 2 is below the glass softening point, thereby effectively performing curved surface deformation on the required curved surface forming portion of the glass 2, effectively avoiding the thermal deformation of the remaining portion of the glass 2, and minimizing the forming defect. Herein, optionally, in the heating segment 13, the glass 2 can be firstly preheated 300° C. to 400° C. before the heating structure heats the glass 2, so as to improve the heating efficiency of the glass 2. The required curved surface forming portion of the glass 2 is directly heated by the heating block 6 as described above, whereby accurate control of the temperature of the glass 2 can be ensured, and the heating time can be shortened, thereby effectively improving the heating efficiency of the glass 2, and also having an energy saving effect. However, the present disclosure is not limited thereto, the heating structure can also adopt other reasonable structures, as long as the function of heating the required curved surface forming portion of the glass 2 can be realized, for example, a heating surface of the heating block 6 of the heating structure corresponding to the glass 2 can be formed as a plane.

Optionally, a portion of the furnace body 1 corresponding to the rotary table 3 is formed into an annular body or a cylinder, a plurality of stations are formed in a circumferential direction of the furnace body 1, and the heating segment 13, the forming segment and the cooling segment 14 are respectively arranged on the stations. In an exemplary embodiment, going around the circumference of the furnace body in a circumferential direction, the furnace body may be divided into a first segment 101, a second segment 102, a third segment 103, a fourth segment 104, a fifth segment 105, a sixth segment 106, a seventh segment 107, an eighth segment 108, a ninth segment 109, a tenth segment 110, and an eleventh segment 111, as shown in FIG. 1, but other circumferential divisions of the furnace body may also be contemplated. In such an exemplary division, the first 101 and third 103 segments may be heating segments 13, the tenth segment may be a cooling segment 14, and the fifth 105, seventh 107, ninth 109, eleventh 111, second 102, and fourth 104 segments may be forming segments. The furnace body 1 has the functions of realizing thermal insulation and heat preservation, and mounting a heating apparatus, a driving mechanism and other auxiliary devices. As described above, the glass 2 arranged on the female dies 4 is driven by the rotary table 3 to circularly rotate so as to be conveyed to the heating segment 13, the forming segment and the cooling segment 14 to perform heating, forming and cooling setting processes, and finally the curved surface forming process of the glass 2 is continuously and circularly achieved, so that continuous production can be achieved to ensure the effects of high production efficiency, energy saving and consumption reduction.

Optionally, in a conveying sequence of the rotary table 3, the heating segment 13 is arranged on the foremost station of the furnace body 1, a sheet glass feeding machine 7 for feeding the glass 2 is arranged on the heating segment 13, the cooling segment 14 is arranged on the last station of the furnace body 1, a sheet glass taking machine 8 is arranged on the cooling segment, and the forming segments are arranged on at least two stations between the foremost station and the last station. Here, the glass 2 is fed onto the female dies 4 on the heating segment 13 by the sheet glass feeding machine 7, the glass 2 is sequentially conveyed to the forming segments and the cooling segment 14 by the rotary table 3 to perform curved surface forming and cooling sizing, and then the glass 2 is taken out from the cooling segment 14 by the sheet glass taking machine 8, so that the curved surface forming operation can be performed on the glass 2 quickly and continuously. In addition, since the forming segments are arranged on at least two stations between the foremost station and the last station, the curved surface forming can be performed on the glass 2 stably and reliably, and the curved surface forming quality is improved.

Figure 3:
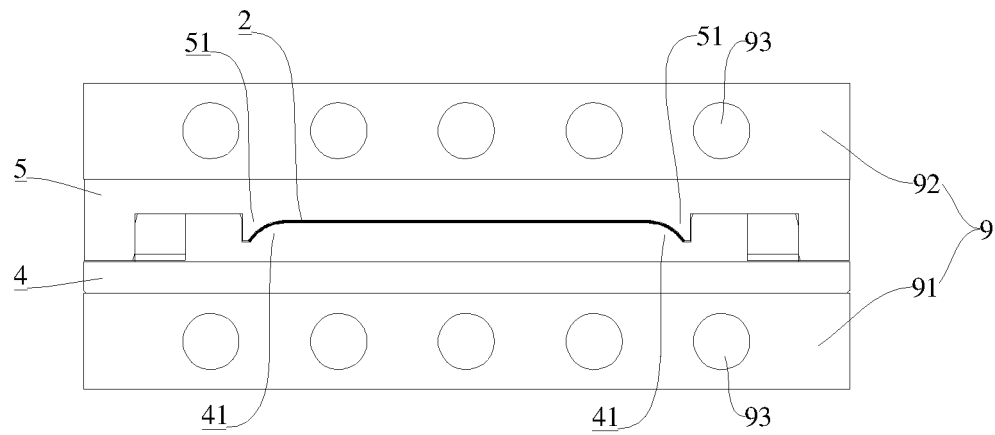
FIG. 3 is a die closing state diagram of a male die and a female die in the curved surface thermal forming device according to the specific embodiment of the present disclosure.
Figure 4:
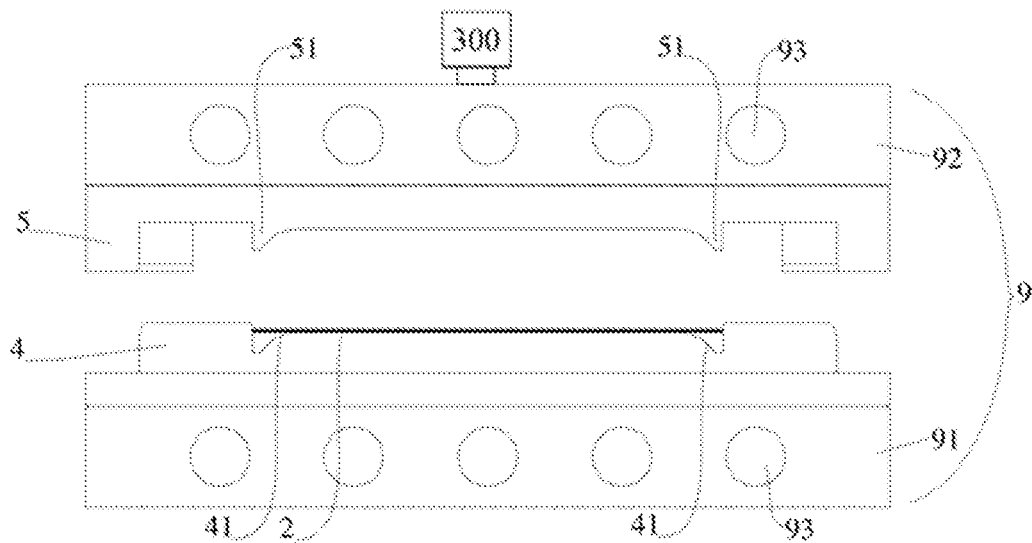
FIG. 4 is a die separating state diagram of the male die and the female die in the curved surface thermal forming device according to the specific embodiment of the present disclosure.

Optionally, as shown in FIG. 3, the forming segment includes a male die closing segment portion and a curved surface forming segment portion, a male die 5 is arranged on the male die closing segment portion to be capable of being closed with the female die 4 after the heating on the glass (2) is completed by which cooperating with the heating structure, and a pressure device 300 is arranged on the curved surface forming segment portion to apply a pressure to the male die 5 after the die closing so as to perform curved surface forming on the glass 2. Here, for example, in the case that the curved surface forming needs to be performed on the both side edges of the glass 2, as shown in FIG. 4, an accommodating groove for accommodating the glass 2 is formed in the female die 4, bending portions 41 bending toward a direction facing away from the glass 2 are formed on both sides of the accommodating groove, and pressure application portions 51 having shapes corresponding to those of the bending portions 41 are convexly formed on a portion of the male die 5 corresponding to the bending portions 41. Thereby, a pressure is applied to the both side edges of the glass 2 through the cooperation of the pressure application portions 51 of the male die 5 and the bending portions 41 of the female die 4, so that the both side edges of the glass 2 are deformed to form curved surfaces. However, the present disclosure is not limited thereto, and the structures of the female die 4 and the male die 5 are rationally designed in accordance with the actual required curved surface forming portion of the glass 2. In addition, the female die 4 and the male die 5 can employ graphite dies, thereby having the advantages of good high temperature resistance, small expansion deformation and stable performance. Hereby, in the case that the graphite dies serve as the female die 4 and the male die 5, the furnace body 1 may be filled with a nitrogen gas to prevent the graphite dies from being oxidized, thereby prolonging the service life. However, the present disclosure is not limited thereto, and for example, the female die 4 and the male die 5 can also adopt such dies as stainless steel.

Optionally, the male die 5 in the forming segment can be rotated to the station in front of the cooling segment 14 together with the female die 4 after being closed with the male die 4. Here, a control device for controlling the pressure applied to the glass 2 can also be arranged in the forming segment, so that the curved surface forming of the glass 2 can be accurately controlled. As described above, in the curved surface forming process of the glass 2, the male die 5 always keeps a die closing state with the female die 4 to move to the front of the cooling segment 14 together with the female die 4, so that the curved surface forming of the glass 2 can be realized more stably, and the thermal deformation of the remaining portion of the glass 2 excluding the required curved surface forming portion.

Optionally, as shown in FIG. 4, the forming segment further includes a male die separating segment portion located between the curved surface forming segment portion and the cooling segment 14 and for separating the male die 5 from the female die 4. After the male die 5 is separated from the female die 4 in the male die separating segment portion, the rotary table 3 drives the glass 2 on the female die 4 to rotate to the cooling segment 14 for cooling and sizing. Here, the glass 2 can be cooled in a natural cooling or forced cooling manner, for example, when the forced cooling manner is employed, the cooling and sizing of the glass 2 can be achieved by blowing air to the cooling segment 14 through a convection fan.

Optionally, the male die separating segment portion and the male die closing segment portion share one male die 5. That is, after the male die 5 is separated from the female die 4 in the male die separating segment portion, the male die 5 can be moved into the male die closing segment portion by a driving mechanism such as a rotating mechanism, and is conveyed to the female die 4 in the male die closing segment portion for die closing. Thereby, resources can be effectively utilized, and the manufacturing cost of the curved glass thermal forming device can be reduced. However, the present disclosure is not limited thereto, and the number of the male dies 5 and the positions thereof in the furnace body 1 can be reasonably arranged according to actual needs.

Optionally, the curved surface forming segment portions are arranged on at least two stations of the furnace body 1, and the curved surface forming segment portions are sequentially arranged in the conveying sequence. Here, in the case that the rotary table 3 adopts a stepping rotation manner, when the rotary table 3 rotates by one station in every stepping process along the circumferential direction of the furnace body 1 in the conveying sequence, the curved surface forming segment portions on the at least two stations are adjacently arranged; when the rotary table 3 rotates by two stations in every stepping process along the circumferential direction of the furnace body 1 in the conveying sequence, the curved surface forming segment portions on the at least two stations are spaced apart by one station, so that when the rotary table 3 rotates from the curved surface forming segment portion on a certain station, the rotary table can move onto the curved surface forming segment portion on the other station. Therefore, by disposing the at least two curved surface forming segment portions, the curved surface forming quality of the glass 2 is further improved, and then the processing efficiency is improved.

Optionally, as shown in FIG. 3 and FIG. 4, a heating device 9 for heating the female die 4 and the male die 5 are arranged in the furnace body 1. Thereby, the temperature range required for the glass 2 on each station can be satisfied by controlling the heating temperature of the female die 4 and the male die 5 by the heating device 9. Here, optionally, as shown in FIG. 3 and FIG. 4, the heating device 9 can include a female die heating device 91 arranged on the surface of the female die 4 facing away from the glass 2, and a male die heating device 92 arranged on the surface of the male die 5 facing away from the glass 2, and a controller, 200, for controlling the heating temperature of the female die heating device 91 and the male die heating device 92 is arranged on the heating device 9. The female die heating device 91 and the male die heating device 92 can employ an electric heating manner provided with an electric heating rod 93, and the female die 4 and the male die 5 are respectively heated by the female die heating device 91 and the male die heating device 92, in this way, the heat is indirectly transferred by the female die 4 and/or the male die 5 to the glass 2 to accurately control the temperature of the glass 2. However, the present disclosure is not limited thereto, other manners can also be employed, for example, the temperature of the glass 2 can be controlled by controlling the temperature of the gas in the furnace body 1.

Optionally, a cleaning device 202 for cleaning the male die 4 on the rotary table 3 is arranged on the cooling segment 14. In the cooling segment 14, the glass 2 can be cooled to 300° C. to 400° C. According to the structure as described above, the female die 4 on the rotary table 3 cleaned by the cleaning device 202 in the cooling segment 14 is turned to the next station, that is, the foremost station, and then the next curved surface forming process circulation is performed again.

Optionally, the furnace body 1 further includes a feed segment 15 having the feed port 11 and a discharge segment 16 having the discharge port 12, and in the conveying sequence of the rotary table 3, the feed segment 15 is in communication with the heating segment 13 located at the foremost station, and the discharge segment 16 is in communication with the cooling segment 14 located at the last station. Optionally, a gas supply device 204 for injecting a nitrogen gas is arranged in the furnace body 1, so that the furnace body 1 is filled with the nitrogen gas with a preset pressure in a curved surface forming process of the glass. Thereby, the entire curved surface forming process of the glass 2 is performed in a nitrogen environment, so that the phenomenon that the female die 4 and the male die 5 are oxidized can be effectively prevented, thereby significantly prolonging the service lives of the dies.

Optionally, multiple layers of one-way doors 208 for preventing the entry of external air are respectively arranged on the feed port 11 and the discharge port 12. (FIG. 1 shows a set of layered barrier structures 206 including multiple layers of one-way doors 208.) Here, optionally, the pressure of the nitrogen gas in the furnace body 1 is greater than the air pressure at the outside of the furnace body 1, thereby effectively preventing the inflow of the external air in the process of feeding the glass into the feed segment 15 or taking out the glass 2 from the discharge segment 16.

Optionally, an odd number of stations being equal to five or more are formed on a portion of the furnace body 1 corresponding to the rotary table 3 along the circumferential direction, the rotary table 3 conveys the glass 2 in a stepping manner by every other station, and a conveying period required for the rotary table 3 to complete the curved surface forming of the glass 2 is two circles. Here, based on the above-described technical solutions, the structure of the curved glass thermal forming device according to one of the specific embodiments will be specifically described below.

As shown in FIG. 1, eleven stations are formed on the portion of the furnace body 1 corresponding to the rotary table 3 along the circumferential direction, in order to conveniently illustrate the structure of the curved glass thermal forming device in the present embodiment, the eleven stations are sequentially named as first station to eleventh station counterclockwise along the circumferential direction, and furthermore, since the rotary table 3 conveys the glass 2 in the stepping manner by every other station, the conveying sequence of the rotary table 3 is the first station, the third station, the fifth station, the seventh station, the ninth station, the eleventh station, the second station, the fourth station, the sixth station, the eighth station and the tenth station in sequence. Here, the first station is the foremost station, and the tenth station is the last station. The heating segment 13 can include a preheating segment portion and a heating segment portion, the preheating segment portion can be arranged on the first station serving as the foremost station and is provided with the sheet glass feeding machine 7 as described above, and the heating segment portion is arranged on the third station and is provided with the heating structure as described above. The male die closing segment portion of the forming segment is arranged on the fifth station, the curved surface forming segment portions of the forming segment can be respectively arranged on the seventh station, the ninth station, the eleventh station, the second station and the fourth station, furthermore the male dies 5 on the plurality of stations arranged on the curved surface forming segment portions always keep a die closing state of the female dies 4, in the state, a pressure can be applied to the male dies 5 by a driving cylinder and other structures, so that the pressure can be applied to the required curved surface forming portion of the glass 2 more sufficiently to realize reliable bending deformation thereof, and furthermore, since the male dies 5 always keep the die closing state of the female dies 4 in the process, the thermal deformation of the remaining portion of the glass 2 is avoided. The male die separating segment portion of the forming segment is arranged on the sixth station, and here, the fifth station and the sixth station can share one male die 5 to make full use of effective resources and reduce the manufacturing cost of the device. Here, the male die 5 on the sixth station is moved to the fifth station after being separated from the female die 4 placed on the sixth station to be closed with the female die 4 on the fifth station. In addition, the cooling segment 14 may include a cooling segment portion and a discharge segment portion, the cooling segment portion is arranged on the eighth station and performs natural cooling or forced cooling on the glass, the discharge segment portion is arranged on the tenth station and is provided with the sheet glass taking machine 8 as described above, and the natural cooling or forced cooling can also be continued on the glass on the discharge segment portion.

Here, the working process of the curved glass thermal forming device having the structure as described above will be described with reference to FIG. 1 to FIG. 4. The glass 2 is fed from the feed segment 15 communicating with the first station, and the glass 2 is placed on the female die 4 corresponding to the rotary table 3 on the preheating segment portion of the first station through the sheet glass feeding machine 7. Here, the glass 2 can be preheated to 300° C. to 400° C. by heating the female die 4 via the female die heating device 91. Then, the rotary table 3 drives the female die 4 carrying the preheated glass 2 to move to the heating segment portion of the third station, at this time, the heating block 6 of the heating structure can be moved to a position corresponding to the female die 4 carrying the preheated glass 2, after the heating block 6 is moved in the height direction to a position 0.2 mm to 1 mm away from the glass 2, the required curved surface forming portion of the glass 2 is heated to 700° C. to 800° C., and the temperature of the remaining portion of the glass 2 is lower than the softening point of 50° C. to 100° C. and is higher than a glass annealing point, in order to avoid unnecessary thermal deformation of the remaining portion of the glass 2. Thereafter, the heating block 6 is separated from the female die 4 carrying the heated glass 2, and the rotary table 3 drives the female die 4 carrying the heated glass 2 to move to the male die closing segment portion of the fifth station, at this time, the male die 5 is moved to a position corresponding to the female die 4 carrying the heated glass 2 via the driving mechanism or the like and is closed with the female die 4, wherein the male die 5 can be heated by the male die heating device 92 in the process of moving the male die 5 via the driving mechanism or the like. Thereafter, the rotary table 3 drives the female die 4 and the male die 5 after die closing to move to the seventh station 107, the ninth station 109, the eleventh station 111, the second station 102 and the fourth station 104 serving as the curved surface forming segment portions, wherein a pressure is applied to the male die 5 by the pressure device 300 at the above-mentioned stations to perform curved surface forming on the required curved surface forming portion of the glass 2, and the heating temperature of the glass 2 can also be controlled by the female die heating device 91 and the male die heating device 92. In the curved surface forming process of the glass 2, the male die 5 and the female die 4 always keep the die closing state, and a preset pressure is applied to the curved surface forming portion of the glass 2 by the pressure device 300, accordingly, when being conveyed to the fourth station, the curved surface forming portion of the glass 2 is substantially shaped. Thereafter, the rotary table 3 drives the female die 4 and the male die 5 carrying the glass 2 after the curved surface forming to the male die separating segment portion of the sixth station, at this time, after the male die 5 is separated from the female die 4 on the sixth station by the driving mechanism or the like, the male die 5 is moved to the fifth station to be closed with the female die 4 on the fifth station. Then, the rotary table 3 drives the female die 4 after die separation to move to the cooling segment portion of the eighth station, where the glass 2 is cooled to 300° C. to 400° C. by natural cooling or forced cooling, thereby completing the cooling and sizing of the glass 2. Then, the rotary table 3 drives the female die 4 carrying the cooled and shaped glass 2 to move the discharge segment portion of the tenth station, and at this time, the glass 2 is taken out from the female die 4 by the sheet glass taking machine 8 and is removed from the furnace body 1 by the discharge segment 16 communicating with the discharge segment portion. As described above, in the heating segment 13, since the local heating is performed on the required curved surface forming portion of the glass 2 by the heating structure, accurate control of the temperature of the glass 2 can be ensured, and the heating time can be shortened, thereby improving the heating efficiency of the glass 2, and further improving the operation efficiency of curved surface forming of the glass 2. In addition, the curved surface forming process of the entire glass 2 is performed in a working environment in which the furnace body 1 is filled with the nitrogen gas, so that the female die 4 and the male die 5 can be effectively prevented from being oxidized under repeated temperature changes, accordingly, the service lives of the dies are prolonged, and then the curved surface forming quality of the glass 2 is effectively ensured.

According to another aspect of the present disclosure, a curved glass thermal forming method is further provided, in which the curved glass thermal forming device described above is used to perform curved surface forming on the glass 2. The curved glass thermal forming method has the above-mentioned acting effects brought about by the above-mentioned curved glass thermal forming device.

The preferred embodiments of the present disclosure have been described in detail above with reference to the drawings. However, the present disclosure is not limited to the specific details in the above embodiments, various simple variations can be made to the technical solutions of the present disclosure within the scope of the technical idea of the present disclosure, and these simple variations are all within the protection scope of the present disclosure.

It should be further noted that the specific technical features described in the above specific embodiments may be combined in any suitable manner without contradiction. In order to avoid unnecessary repetition, various possible combination modes are not additionally illustrated in the present disclosure.

In addition, any combination of various different embodiments of the present disclosure can be made as long as it does not contradict the idea of the present disclosure, and it should also be regarded as the contents disclosed by the present disclosure.

The invention claimed is:

1. A curved glass thermal forming device, comprising:
a furnace body comprising:
a feed port, and
a discharge port,
wherein the furnace body further comprises a plurality of segments, comprising:
a first segment comprising a first heater,
an intermediate segment comprising a male die, and
a last segment, said last segment configured to provide at least one of natural cooling or forced cooling,
wherein the furnace body further comprises:
a rotary table arranged in the furnace body and capable of rotating and configured to circularly convey glass to the first segment, the intermediate segment, and the last segment in sequence, the rotary table comprising a plurality of female dies for carrying glass arranged on the rotary table, said plurality of female dies having recesses formed opposite to protrusions formed on the male die in the intermediate segment, said protrusions of the male die configured to extend into one or more of the recesses during press fit forming on the glass,
wherein each of the plurality of female dies is separable from the male die and rotationally adjustable from the male die, and wherein the rotary table is configured to rotate the male die together with at least one of the plurality of female dies after the at least one of the plurality of female dies is closed with the male die in at least one rotary operation configured to be performed by the rotary table, said at least one rotary operation including a rotary operation across a plurality of areas of the intermediate segment beginning at an area prior to a curved surface forming segment portion and ending at an area following the curved surface forming segment portion, and
wherein the first heater is configured to perform local heating on a required curved surface forming portion of the glass in a condition where the glass is retained in one of the female dies, wherein at least a portion of the first heater is above the required curved surface forming portion of the glass, and the said required curved surface forming portion of the glass is retained in a position above a recess of the one of the female dies.

2. The curved glass thermal forming device according to claim 1, wherein:
wherein the first heater comprises a heating block for heating the glass,
the heating block is provided with a concave surface and a non-concave surface corresponding to a heating surface of the glass, and
the non-concave surface comprises protrusions of the first heater, wherein said protrusions of the first heater are above the required curved surface forming portion of the glass.

3. The curved glass thermal forming device according to claim 1, wherein the rotary table is disposed beneath a portion of the furnace body, said portion of the furnace body having an annular body shape or a cylinder shape, wherein a plurality of stations are formed around a circumference of the furnace body, and wherein the first segment, the intermediate segment and the last segment are respectively arranged on the stations.

4. The curved glass thermal forming device according to claim 3, wherein in a conveying sequence of the rotary table extending from a foremost section of the furnace body to a last station of the furnace body in a circular manner around the rotary table, the first segment is arranged on the foremost station of the furnace body, the last segment is arranged on the last station of the furnace body, and the intermediate segment and at least one other segment comprising a further male die are arranged on at least two stations between the foremost station and the last station.

5. The curved glass thermal forming device according to claim 4, wherein the intermediate segment comprises a first area and a second area, wherein the male die of the intermediate segment is arranged in the first area to be capable of being closed with a female die in the plurality of female dies after the heating on the glass is completed by cooperating with the heater, and
wherein the intermediate segment is configured to apply a pressure to the male die in the second area after the die closing so as to perform curved surface forming on the glass.

6. The curved glass thermal forming device according to claim 5, wherein the at least one rotary operation comprises rotating the male die in the intermediate segment to a station in front of the last segment together with the female die after being closed with the male die.

7. The curved glass thermal forming device according to claim 6, wherein the intermediate segment further comprises a third area located between the curved surface forming segment portion and the last segment, wherein the intermediate segment is configured to separate the male die from the female die in the third area.

8. The curved glass thermal forming device according to claim 7, wherein the first area and the third area share one male die.

9. The curved glass thermal forming device according to claim 5, wherein the second area and a further second area in which the curved glass thermal forming device is configured to apply pressure to the male die are arranged on at least two stations of the furnace body, wherein the second area and the further second area are sequentially arranged in the conveying sequence.

10. The curved glass thermal forming device according to claim 3, wherein an odd number of stations being equal to five or more are formed on a portion of the furnace body corresponding to the rotary table along the circumferential direction, the rotary table conveys the glass in a stepping manner by every other station, and a conveying period required for the rotary table to complete the curved surface forming of the glass is two circles.

11. The curved glass thermal forming device according to claim 1, wherein the curved glass thermal forming device further comprises a second heater, wherein the second heater is configured to heat the female die and the male die.

12. The curved glass thermal forming device according to claim 11, wherein the second heater comprises a female die heater arranged on the surface of a female die in the plurality of female dies facing away from the glass, and a male die heater arranged on the surface of the male die facing away from the glass, and a controller for controlling the heating temperature of the female die heater and the male die heater is arranged on the heater.

13. The curved glass thermal forming device according to claim 1, wherein the curved glass thermal forming device is configured to clean the male die on the rotary table when the male die is disposed in the last segment.

14. The curved glass thermal forming device according to claim 1, wherein the furnace body further comprises a feed segment having the feed port and a discharge segment having the discharge port, and in a conveying sequence of the rotary table, the feed segment is in communication with the first segment, said first segment located at a foremost station, and the discharge segment is in communication with the last segment, said last segment located at a last station.

15. The curved glass thermal forming device according to claim 14, wherein the furnace body further comprises a gas injector configured to inject a nitrogen gas, said gas injector configured to fill the furnace body with the nitrogen gas with a preset pressure in a curved surface forming process of the glass.

16. The curved glass thermal forming device according to claim 14, wherein multiple layers of one-way doors for preventing the entry of external air are respectively arranged on the feed port and the discharge port.

* * * * *